US009378503B2

(12) United States Patent
Stolyar (10) Patent No.: US 9,378,503 B2
(45) Date of Patent: Jun. 28, 2016

(54) METHODS OF ROUTING FOR NETWORKS WITH FEEDBACK

(75) Inventor: Aleksandr Stolyar, Basking Ridge, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 1246 days.

(21) Appl. No.: 12/801,893

(22) Filed: Jun. 30, 2010

(65) Prior Publication Data
US 2012/0005370 A1    Jan. 5, 2012

(51) Int. Cl.
*G06F 15/173*    (2006.01)
*G06Q 30/00*    (2012.01)
*H04L 12/00*    (2006.01)
*H04L 29/08*    (2006.01)

(52) U.S. Cl.
CPC ............ *G06Q 30/00* (2013.01); *H04L 12/00* (2013.01); *H04L 67/1014* (2013.01); *H04L 67/1023* (2013.01); *H04L 67/327* (2013.01)

(58) Field of Classification Search
None
See application file for complete search history.

(56) References Cited

U.S. PATENT DOCUMENTS

| | | | | |
|---|---|---|---|---|
| 6,175,869 B1* | 1/2001 | Ahuja et al. | ................. | 709/226 |
| 6,338,089 B1* | 1/2002 | Quinlan | ....................... | 709/227 |
| 7,207,043 B2* | 4/2007 | Blythe et al. | ................. | 718/104 |
| 2003/0195962 A1* | 10/2003 | Kikuchi et al. | ............... | 709/226 |
| 2006/0031536 A1* | 2/2006 | Eydelman et al. | ........... | 709/228 |
| 2007/0150329 A1* | 6/2007 | Brook et al. | ..................... | 705/8 |
| 2011/0072436 A1* | 3/2011 | Gilat et al. | .................... | 718/104 |
| 2011/0161980 A1* | 6/2011 | English et al. | ............... | 718/105 |

OTHER PUBLICATIONS

Stolyar, Aleksandr "Maximizing Queueing Network Utility Subject to Stability: Greedy Primal-Dual Algorithm". Queueing Systems 50, pp. 401-457, 2005.

* cited by examiner

*Primary Examiner* — Azizul Choudhury
(74) *Attorney, Agent, or Firm* — Harness, Dickey & Pierce, P.L.C.

(57) ABSTRACT

Example embodiments are directed to methods of routing requests within a system having a plurality of server pools. At least one of the methods provides a method of routing requests within a system having a plurality of server pools. The method includes receiving a request at the system, first determining a first value associated with a first request type of the received request and second determining a probability of routing based on the first value and a probability of rerouting. The first value is a virtual queue value for requests of the first request type. The second determining is performed without determining an input rate at which the requests of the first request type are received. The received request is routed to at least one of the plurality of server pools based on the probability of routing.

20 Claims, 7 Drawing Sheets

METHODS OF ROUTING FOR NETWORKS WITH FEEDBACK

BACKGROUND

Example embodiments relate to networks of server pools, such as call centers, for example.

In a network with server pools, a control strategy is often implemented. The control strategy may include a method of routing calls incoming to the network. A routing method applies to a network that may be flexible in the sense that service speed depends on a customer (e.g., request) type and the server pool where the customer is served. Types of requests may include calls requesting account transactions, loan applications and technical support, for example. In the art, request and customer may be used interchangeably. It should be understood that a customer may have multiple requests.

When a request is received (customer arrives) the routing method should route the received request when there are available servers in at least one pool.

A network where a customer's request is completed by a server and the customer then requires another service (e.g., another request) is referred to as a network with feedback. An example of a network with feedback is a network that allows a customer to check an account balance and then require another transaction, e.g., apply for a loan.

Conventional routing methods for networks with feedback require explicit a priori knowledge or explicit measurement of customer input flow rates, per each customer type. The input rate is used to explicitly solve an underlying optimization problem, which may be a linear program, for example. The solution to the linear program is then used to guide actual routing of customers to and between the servers.

The approach based on explicitly solving the linear program has high complexity and is not robust because different iterations of the linear program need to be performed when input rates change. Moreover, input rates are generally not known in advance and the times when they change are not known in advance. Thus, the linear programming approach does not respond quickly to sudden changes in input rates.

SUMMARY

Example embodiments are directed to routing methods in networks with feedback. Example embodiments include "running" a virtual (shadow-system) queuing system based on actual arrivals of requests to the network. Example embodiments produce routing automatically, without explicitly solving the linear program and measuring input rates. The state of the shadow system "guides" routing decisions in the real system. Thus, example embodiments have a lower implementation complexity and higher robustness.

Example embodiments do not require a priori knowledge or explicit measurement of input rates of different request types. Moreover, example embodiments disclose methods for server pool load balancing when a system is not overloaded, and other methods for managing system revenue when the system is overloaded. Methods for managing system revenue include methods for picking customers that should be blocked, i.e., denied service, for maximizing system average revenue.

At least one example embodiment provides a method of routing requests within a system having a plurality of server pools. The method includes receiving a request at the system, first determining a first value associated with a first request type of the received request and second determining a probability of routing based on the first value and a probability of rerouting. The first value is a virtual queue value for the first request type. The second determining is performed without determining an input rate at which the requests of the first request type are received. The received request is routed to at least one of the plurality of server pools based on the probability of routing.

In at least another example embodiment, a method of controlling a routing system includes receiving a request having a first request type, updating the first value periodically based on mean service times of processing requests of different types by different server pools, the probabilities of rerouting, and at least a second value associated with a second type of request, without determining an input rate at which the requests are received. The first value is a virtual queue value for the first request type and the second value is a virtual queue value for the second request type. Routing probabilities are updated based on the updated first value and the request is routed based on the updated routing probabilities.

BRIEF DESCRIPTION OF THE DRAWINGS

Example embodiments will be more clearly understood from the following detailed description taken in conjunction with the accompanying drawings. FIGS. 1A-3 represent non-limiting, example embodiments as described herein.

DETAILED DESCRIPTION

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes (e.g., a scheduler, router or gateway). Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. Example embodiments are not limited by these aspects of any given implementation.

Example embodiments are directed to routing methods in networks with feedback. Example embodiments include "running" a virtual (shadow-system) queuing system based on actual arrivals of customers to the network. Example embodiments produce routing automatically, without explicitly solving the linear program and measuring input rates. The state of the shadow system "guides" routing decisions in the real system.

Example embodiments do not require a priori knowledge or explicit measurement of input rates of different request types. Moreover, example embodiments disclose methods for server pool load balancing when a system is not overloaded, and other methods for managing system revenue when the system is overloaded. Methods for managing system revenue (reward) pick customers that should be blocked, i.e., denied service.

Figure 1A:
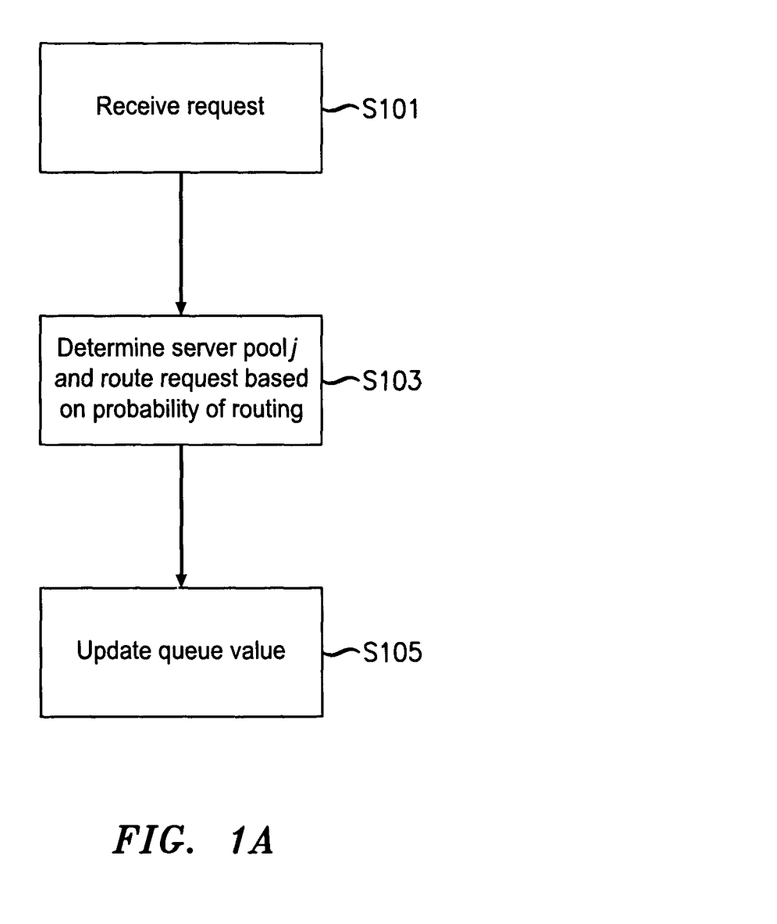
FIGS. 1A-1C illustrate methods of routing requests according to an example embodiment.
Figure 1B:
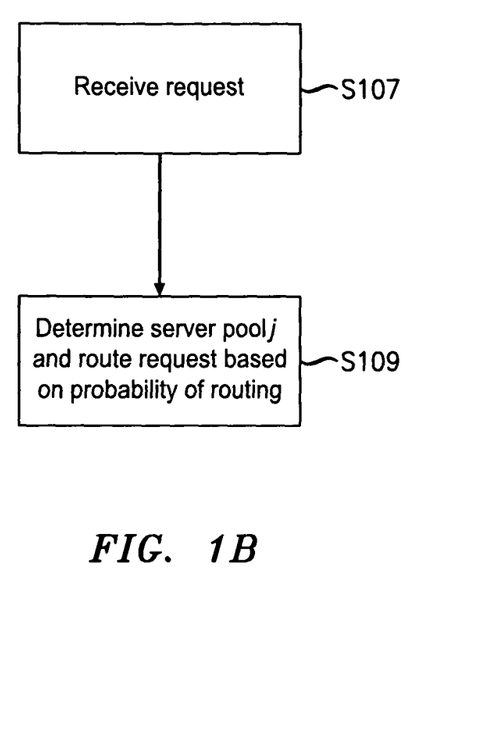
Figure 1C:
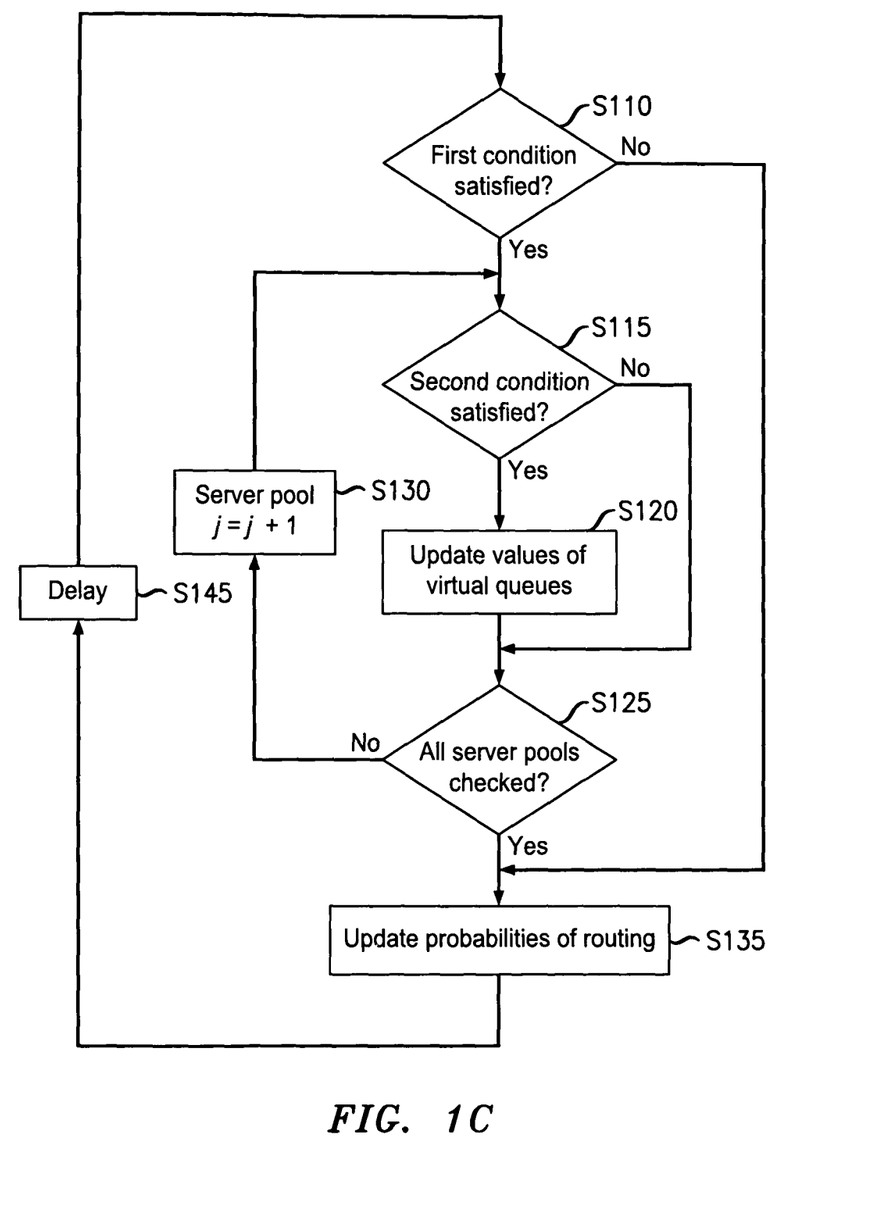
Figure 2A:
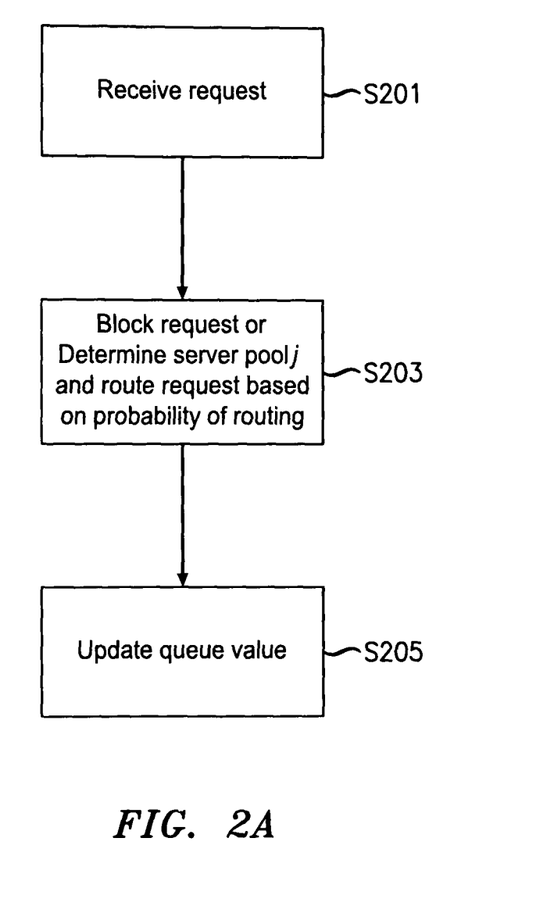
FIGS. 2A-2C illustrate methods of routing requests according to an example embodiment.
Figure 2B:
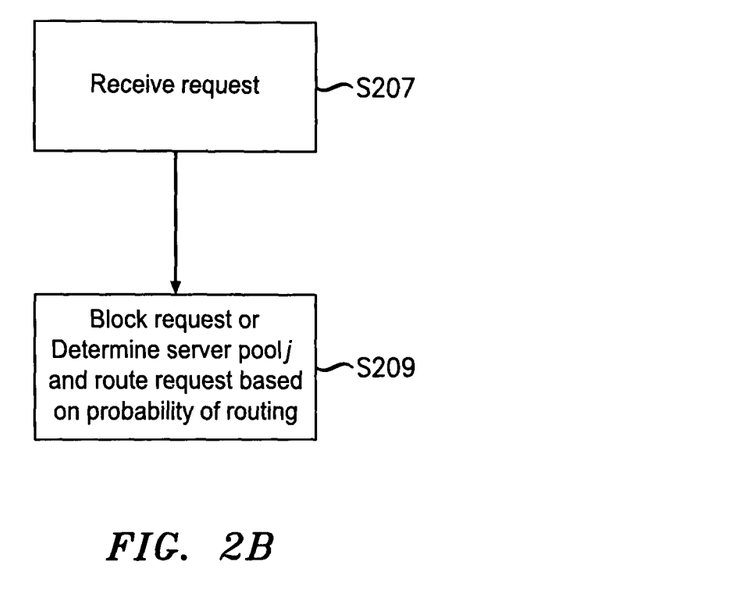
Figure 2C:
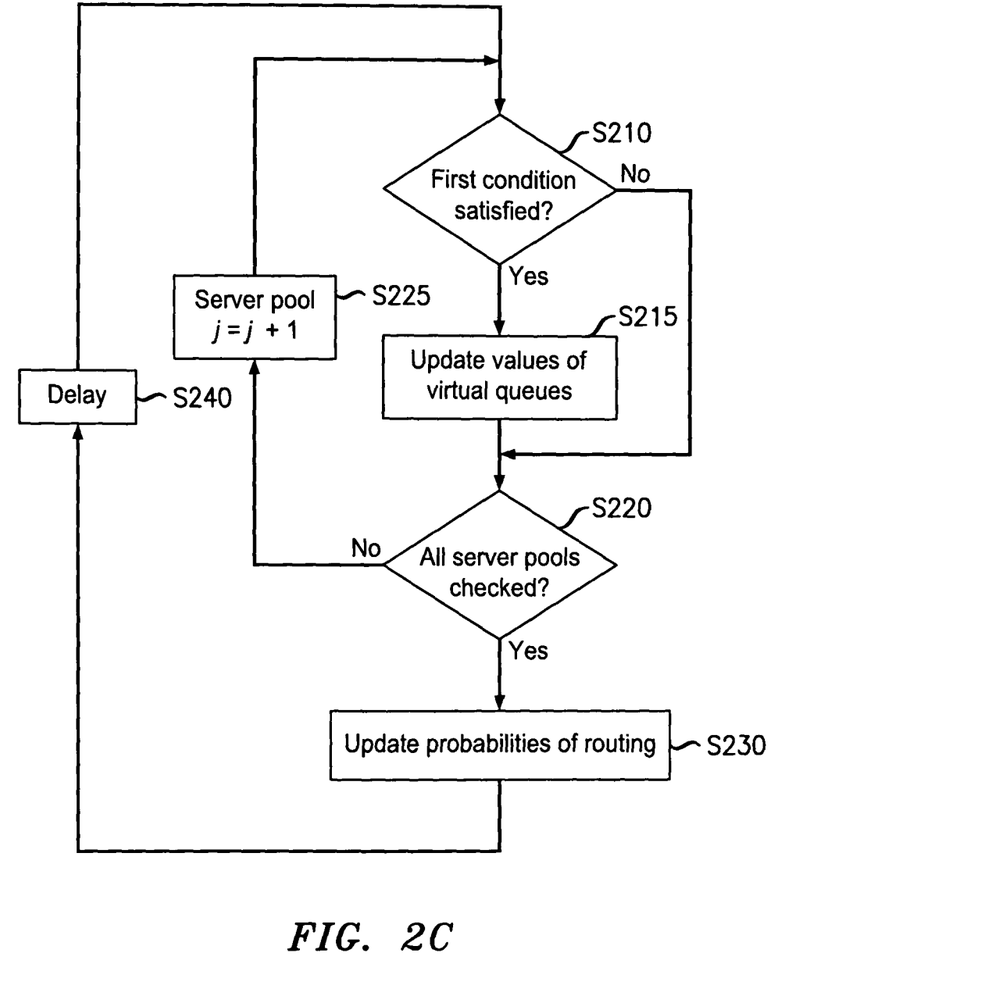
Figure 3:
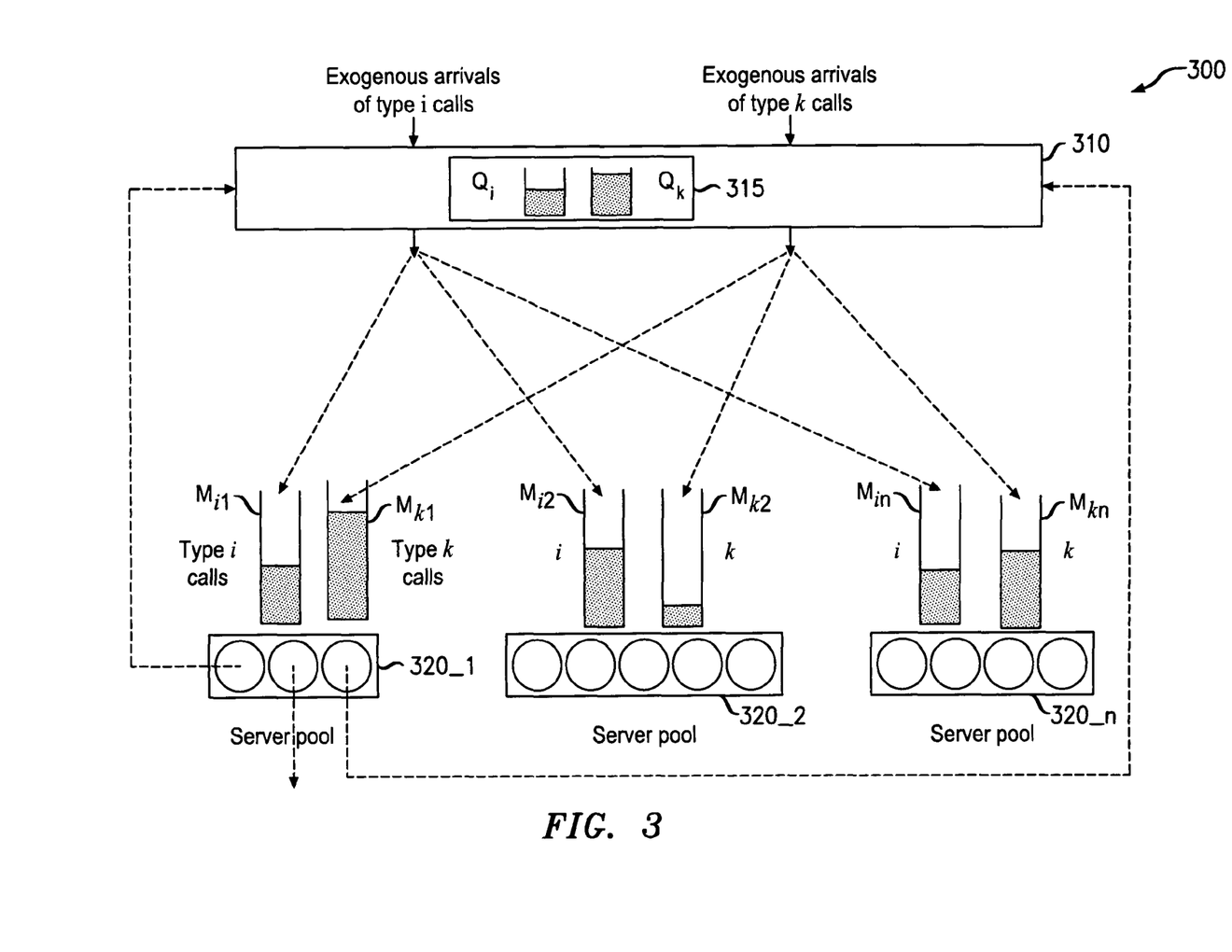
FIG. 3 illustrates a system for routing requests according to an example embodiment.

Algorithms implemented in the methods shown in FIGS. 1A-1C and 2A-2C may be implemented by the system shown in FIG. 3. The system shown in FIG. 3 is described after the description of the methods according to example embodiments.

In example embodiments, there may be 1–I request types (type of request) where i is one of the request types 1–I having a rate of exogenous arrivals equal to $\lambda_i r$, where r is a scaling parameter. Example embodiments, however, do not need to know in advance or explicitly measure the rates $\lambda_i r$.

It should be understood that the terms "request" and "customer" may be used interchangeably.

There may be 1–J server pools where j is one of the server pools having $\beta_j r$ servers and thus, $\beta_j$ is proportional to the number of servers in the server pool j. All servers within the same server pool j have similar or identical service skills. A mean service time of a request type i customer by a type j server is $1/\mu_{ij}$.

After completion of the request type i request by the pool j server, the request with a rerouting probability $p_{ik}^{(j)}$, brings a system operator a reward $w_{ik}^{(j)}$ and changes to a request type k, where k is one of the request types 1–I or equal to zero. Reward may be referred to as an immediate (e.g., transaction fee) or expected future revenue due to a completed service of the request. When a request changes and returns to the system as another request, possibly of a different request type, the system treats the changed request the same way as an externally received request, except the returning call (changed request) does not trigger an initial update in the virtual system. This is described in more detail below with reference to FIGS. 1A-2C. When a request changes to a request type zero, the request leaves the system.

The following notation is applicable to example embodiments:

$$x^+ = \max\{x, 0\} \tag{1A}$$

$$x^- = [-x]^+ = -\min\{x, 0\} \tag{1B}$$

Example embodiments disclose methods for server pool load balancing when a system is not overloaded (load balancing), and other methods for managing system revenue when the system is overloaded. Each of these methods is described in detail.

Throughout example embodiments, there may be multiple request types i and server pools j such that $$i \in \mathcal{I} = \{1, \ldots, I\} \quad (2A)$$

and $$j \in \mathcal{J} = \{1, \ldots, J\} \quad (2B)$$

Load Balancing

FIGS. 1A-1C illustrate methods of routing requests according to an example embodiment of load balancing. The methods illustrated in FIGS. 1A-1C may be implemented by an algorithm for a system that is not overloaded (e.g., a maximum load $\rho < 1$), for example.

It should be understood that the methods of FIGS. 1A-1C may be implemented in the system shown in FIG. 3, which is described in detail below.

Load balancing according to example embodiments results in rates at which a server pool j serves request type i requests (including requests that turn to request type i after a service), being close to the rates $\lambda_{ij}r$ such that a maximum load $\rho$ of server pools is minimized:

$$\min_{\{\lambda_{ij}\},\rho} \rho \quad (3)$$

The minimization of $\rho$ is subject to:

$$\sum_i \lambda_{ij}/(\beta_j \mu_{ij}) \leq \rho, \forall j, \quad (4)$$

$$\lambda_{ij} \geq 0, \forall i, j, \quad (5)$$

$$\sum_j \lambda_{ij} \geq \lambda_i + \sum_{k \in \{1-I\}} \sum_{j \in \{1-J\}} p_{ki}^{(j)} \lambda_{kj}, \forall i \quad (6)$$

The algorithm implemented in the methods of FIGS. 1A-1C maintains a virtual queue $Q_i$ for each request type i. Virtual is used to describe variables that are maintained by the algorithm. In other words, the virtual queue $Q_i$ for each request type i models or represents a number of requests of the request type i in a virtual queue. It should be understood by one of ordinary skill in the art that the algorithm and methods of FIGS. 1A-1C may be implemented in hardware or software of the system, such as software in a router or other devices used for routing requests.

For each request type i and server pool j, variables $A_{ij}$, $\overline{A}_{ij}$, $\Phi_{ij}$ are maintained. $\Phi_{ij}$ is the probability of routing a request of request type i (exogenous or rerouted) to server pool j. $\overline{A}_{ij}$ is the long term average of $A_{ij}$. $A_{ij}$ and $\overline{A}_{ij}$ are initialized to zero at the beginning of the algorithm. Small parameters, $\eta$ and $\eta_1$ are greater than zero and are set to control a tradeoff between a responsiveness of the algorithm and accuracy. In at least one example embodiment, $\eta$ and $\eta_1$ may be between 1/r and 1/sqrt(r), assuming $\beta_j$ is one and r is a large value.

FIG. 1A illustrates a method of routing requests upon exogenous arrivals (requests arriving from outside of the system). At S101, the system receives a request from outside of the system. The request may be a customer call, for example. A request type is associated with the request, such as requesting an account balance.

At S103, the request is routed to a server pool j based on the routing probabilities. The system routes the request using a random number generator having values 1–J with probabilities of being output $\Phi_{i1}$-$\Phi_{iJ}$, respectively. For example, if the random number generator generates a "1", the request is routed to server pool 1. At S105, the algorithm increases a queue value $Q_i$, thus, $$Q_i : Q_i + 1 \quad (7)$$

While FIG. 1A illustrates that the queue value $Q_i$ is updated after the received request is routed, it should be understood that the request may be routed after the queue value $Q_i$ is updated. The method shown in FIG. 1A may be implemented by the algorithm every time a new exogenous request is received by the system when the system is not overloaded.

FIG. 1B illustrates a method of routing requests when a request that has been rerouted within the system is received. The system knows when a request is reroute because the system reroutes the requests. As shown, the request is received within the system at S107. At S109, a server pool j is determined by the algorithm based on the probabilities of routing and is routed by the system to the server pool j. More specifically, the system routes the request using a random number generator having values 1–J with probabilities of being output $\Phi_{i1}$-$\Phi_{iJ}$, respectively. The method shown in FIG. 1B may be implemented by the algorithm every time a rerouted request is received within the system.

FIG. 1C illustrates a method of updating routing probabilities for the methods of routing requests that are shown in FIGS. 1A and 1B. The method shown in FIG. 1C may be run continuously and may be implemented without determining input rates of different request types. At S110, the algorithm determines whether a first condition, $$-1 + \sum_j \max_i c\tau\beta_j\mu_{ij}\left[\eta Q_i - \sum_{k=1}^{I} p_{ik}^{(j)}\eta Q_k\right]^+ \geq 0 \quad (8)$$

is satisfied, wherein $\tau$ and c are parameters greater than zero, $p_{ij}^{(j)}$ is a probability that request type i served by pool j is rerouted as request type k (probability of rerouting), and $Q_k$ is a queue value for request type k. In other words, the virtual queue $Q_k$ for each request type k models or represents a number of requests of the request type k in a virtual queue. Probabilities of rerouting $p_{ik}^{(j)}$, service rates $\mu_{ij}$, and rewards $w_{ij}^{(j)}$ may be determined from historical statistics and/or empirical testing and occasionally updated. The hardware or software implementing the algorithm chooses positive parameters $\tau$ and c; where c is chosen so that a minimum, over (i,j) with $\mu_{ij}$ greater than zero, of the values of $c\beta_j\mu_{ij}$, is greater than $\Sigma_i\lambda_i$.

The software and/or hardware implementing the algorithm, determines the first condition at S110 periodically and/or at regular time intervals. For example, the algorithm performs S110 at time points $\tau/r$, $2\tau/r$, $3\tau/r$ and so on. One of ordinary skill in the art should understand that $\tau$ may be changed to alter the responsiveness of the algorithm.

If the first condition of (8) is not satisfied, the algorithm determines the probability of routing $\Phi_{ij}$ and $\overline{A}_{ij}$ at S135, which is described in further detail below. If the first condition of (8) is satisfied, the algorithm determines for each server pool j, whether a second condition, $$\max_i \mu_{ij}\left[\eta Q_i - \sum_{k=1}^{I} p_{ik}^{(j)}\eta Q_k\right] > 0 \quad (9)$$

is satisfied at S115.

If the second condition of (9) is not satisfied, the algorithm determines whether all of the server pools have been checked at S125. If the second condition of (9) is satisfied then the algorithm determines a number $S_j$, and updates values $Q_{i*}$, $Q_i$ and $A_{i*j}$ at S120 for each server pool 1–J.

At S120, the algorithm first picks:

$$i^* \in \operatorname{argmax}_i \mu_{ij}\left[\eta Q_i - \sum_{k=1}^{I} p_{ik}^{(j)} \eta Q_k\right] \quad (10)$$

The algorithm determines $S_j$, and updates $Q_{i*}$, $Q_i$ and $A_{i*j}$ as follows:

$$S_j = \min\{Q_i, c\tau\beta_j\mu_{i*j}\} \quad (11)$$

$$Q_{i*} := Q_{i*} - (1-p_{i*,i*})S_j \quad (12)$$

$$Q_i := Q_i + p_{i*,i}S_j, \, i \in \mathcal{I}, \, i \neq i^* \quad (13)$$

$$A_{i*j} := A_{i*j} + S_j \quad (14)$$

Once the algorithm determines $S_j$, and updates $Q_{i*}$, $Q_i$ and $A_{i*j}$, the algorithm determines if all of the server pools have been checked at S125. If all of the server pools have not been checked, then the algorithm proceeds to the next server pool j+1 at S130 and determines if the second condition is met for the next server pool at S115.

When all of server pools 1–J have been checked, the algorithm updates the probability of routing $\Phi_{ij}$ and $\overline{A}_{ij}$ based on the queue value and the probability of rerouting $p_{ij}^{(j)}$ and, more specifically, steps S105-S130 at S135.

The algorithm determines the probability of routing $\Phi_{ij}$ and $\overline{A}_{ij}$ for all (i,j) as follows:

$$\overline{A}_{ij} := \eta_1 A_{ij} + (1-\eta_1)\overline{A}_{ij}, \, i \in \mathcal{I}, \, j \in \mathcal{J}, \quad (15)$$

$$\phi_{ij} := \frac{\overline{A}_{ij}}{\sum_m \overline{A}_{im}}, \, i \in \mathcal{I}, \, j \in \mathcal{J} \quad (16)$$

Once the probability of routing $\Phi_{ij}$ and $\overline{A}_{ij}$ are updated, $A_{ij}$ is set to zero.

Since the algorithm may run at time intervals, the algorithm may wait for the next time point of $\tau/r$, $2\tau/r$, $3\tau/r$ at S145 and return to S110.

Reward Managing

FIGS. 2A-2C illustrate methods of routing requests according to an example embodiment of reward managing. The methods illustrated in FIGS. 2A-2C may be implemented by an algorithm for a system that is overloaded (e.g., load $\rho > 1$), for example.

It should be understood that the methods of FIGS. 2A-2C may be implemented in the system shown in FIG. 3, which is described in detail below.

When the system load $\rho$ is greater than its capacity (e.g., $\rho > 1$), some requests should be blocked (dropped). Thus, the system average reward over time, according to example embodiments is maximized, if the average rates $\lambda_{ij}$ (at which the system routes a request of request type i to a server pool j) are such that they are a solution to the following maximization problem:

$$\max_{\{\lambda_{ij}\}} \sum_{i \in \mathcal{I}} \sum_j \lambda_{ij} \sum_{k=0}^{I} p_{ik}^{(j)} w_{ik}^{(j)} \quad (17)$$

The maximum is subject to:

$$\sum_i \lambda_{ij}/(\beta_j\mu_{ij}) \leq 1, \, \forall j, \quad (18)$$

$$\lambda_{ij} \geq 0, \, \forall i, j, \quad (19)$$

and $$\sum_j \lambda_{ij} \leq \lambda_i + \sum_{k \in \mathcal{I}} \sum_{j \in \mathcal{J}} p_{ik}^{(j)} \lambda_{kj}, \, \forall i. \quad (20)$$

The algorithm implemented in the methods of FIGS. 2A-2C maintains a virtual queue $V_i$ for each request type i. It should be understood by one of ordinary skill in the art that the algorithm and methods of FIGS. 2A-2C may be implemented in hardware or software of the system, such as software in a router.

For each request type i and server pool j, variables $A_{ij}$, $\overline{A}_{ij}$, $\Phi_{ij}$, $A_{i0}$, $\overline{A}_{i0}$, and $\Phi_{i0}$ are maintained. $\Phi_{i0}$ is a probability that a request type i request will be blocked. $A_{i0}$ is a number of request of request type i that are blocked (dropped) in the virtual system (as opposed to actually being dropped) in the algorithm shown in FIG. 2C. $\Phi_{ij}$ is the probability of routing the request of request type i to server pool j. $\overline{A}_{ij}$ is the long term average of $A_{ij}$. $A_{ij}$ and $\overline{A}_{ij}$ are initialized to zero at the beginning of the algorithm. Small parameters, $\eta$ and $\eta_1$ are greater than zero and are set to control a tradeoff between a responsiveness of the algorithm and accuracy.

FIG. 2A illustrates a method of routing requests upon exogenous arrivals. At S201, the system receives a request from outside of the system.

At S203, the request is blocked or routed to a sever pool j based on the queue value and probabilities of routing $\Phi_{ij}$ and blocking $\Phi_{i0}$. The system blocks or routes the request using a random number generator having values 0–J with probabilities $\Phi_{i0}$-$\Phi_{iJ}$, respectively. If a value of "0" is generated, then the request is blocked.

At S205, the algorithm decreases a queue value $V_i$ for the request of request type i at S105, thus, $$V_i := [V_i - 1]^+, \quad (21)$$

and $$A_{i0} := A_{i0} + [V_i - 1]^- \quad (22)$$

where $[V_i - 1]^-$ is a number of requests which are block or dropped. In other words, the virtual queue $V_i$ for each request type i models or represents a number of requests of the request type i in a virtual queue.

While FIG. 2A illustrates that the queue value $V_i$ is updated after the received request is routed, it should be understood that the request may be routed after the queue value $V_i$ is updated. The method shown in FIG. 2A may be implemented by the algorithm every time a new exogenous request is received by the system when the system is overloaded.

FIG. 2B illustrates a method of routing requests when a request that has been rerouted within the system is received. As shown, the request is received within the system at S207. At S209, the request is blocked or routed to a sever pool j based on the queue value and probabilities of routing $\Phi_{ij}$ and blocking $\Phi_{i0}$. More specifically, the system blocks or routes the request using a random number generator having values 0–J with probabilities $\Phi_{i0}$-$\Phi_{iJ}$, respectively. If a value of "0" is generated, then the request is blocked. The method shown in FIG. 2B may be implemented by the algorithm every time a rerouted request is received within the system.

FIG. 2C illustrates a method of updating routing probabilities for the methods of routing requests that are shown in FIGS. 2A and 2B. The method shown in FIG. 2C may be run continuously and may be implemented without determining input rates of different request types. Similar to the load balancing algorithm described with reference to FIG. 1C, the software and/or hardware implementing the algorithm runs steps S210-S230 periodically and/or at time intervals. For example, the algorithm performs S210 at time points $\tau/r$, $2\tau/r$, $3\tau/r$ and so on. One of ordinary skill in the art should understand that $\tau$ may be changed to alter the responsiveness of the algorithm.

For a value of j, at S210, the algorithm determines whether a first condition, $$\max_{i} \mu_{ij} \left[ \sum_{k=1}^{I} p_{ik}^{(j)}\left(w_{ik}^{(j)} - \eta V_i + \eta V_k\right) + p_{i0}^{(j)}\left(w_{i0}^{(j)} - \eta V_i\right) \right] > 0 \qquad (23)$$

is satisfied, wherein $p_{ij}^{(j)}$ is a probability that request type i served by pool j is rerouted as request type k (probability of rerouting), and $V_k$ is a queue value for request type k. In other words, the virtual queue $V_k$ for each request type k models or represents a number of requests of the request type k in a virtual queue.

If the first condition of (23) is not satisfied, the algorithm determines whether all of the server pools 1–J have been checked at S220.

If the first condition of (23) is satisfied then the algorithm updates values $V_{i*}$, $V_i$, $A_{i*j}$ and $A_{i0}$ at S215 for each server pool 1–J.

At S215, the algorithm first picks:

$$i^{*} \in \operatorname*{argmax}_{i} \mu_{ij} \left[ \sum_{k=1}^{I} p_{ik}^{(j)}\left(w_{ik}^{(j)} - \eta V_i + \eta V_k\right) + p_{i0}^{(j)}\left(w_{i0}^{(j)} - \eta V_i\right) \right] \qquad (24)$$

The algorithm updates values $V_{i*}$, $V_i$, $A_{i*j}$ and $A_{i0}$ as follows:

$$V_{i*} := V_{i*} + \tau \beta_j \mu_{i*j}(1 - p_{i*,i*}) \qquad (25)$$

$$V_i := [V_i - \tau \beta_j \mu_{i*j} p_{i*,i}]^{+}, \ i \in \mathcal{I}, \ i \neq i^{*} \qquad (26)$$

$$A_{i*j} := A_{i*j} + \tau \beta_j \mu_{i*j} \qquad (27)$$

$$A_{i0} := A_{i0} + [V_i - \tau \beta_j \mu_{i*j} p_{i*,i}]^{-}, \ i \in \mathcal{I}, \ i \neq i^{*} \qquad (28)$$

Once the algorithm updates values $V_{i*}$, $V_i$, $A_{i*j}$ and $A_{i0}$, the algorithm determines if all of the server pools have been checked at S220. If all of the server pools have not been checked, then the algorithm proceeds to the next server pool j+1 at S225 and determines if the first condition is met for the next server pool at S210.

At this point, the loop on j ends. When all of server pools 1–J have been checked, the algorithm updates the probability of routing $\Phi_{ij}$ and $\overline{A}_{ij}$ based on the queue value and a probability of rerouting and, more specifically, steps S205-S220 at S230.

The algorithm determines the probability of routing $\Phi_{ij}$ and $\overline{A}_{ij}$ for all (i,j) as follows:

$$\overline{A}_{ij} := \eta_1 A_{ij} + (1 - \eta_1)\overline{A}_{ij}, \ i \in \mathcal{I}, \ j \in \mathcal{J}, \ j = 0 \qquad (29)$$

$$\phi_{ij} := \frac{\overline{A}_{ij}}{\sum_{m} \overline{A}_{im}}, \ i \in \mathcal{I}, \ j \in \mathcal{J}, \ j = 0 \qquad (30)$$

Once the probability of routing $\Phi_{ij}$ and $\overline{A}_{ij}$ are determined, $A_{ij}$ is set to zero.

Since the algorithm may run continuously at time intervals, the algorithm may wait for the next time point of $\tau/r$, $2\tau/r$, $3\tau/r$ at S240 and return to perform steps S210-S230.

Moreover, the system may tag requests, instead of blocking or dropping the requests. Thus, the tagged requests may still be routed for service according to the same rule, but treated with lower priority while receiving or waiting for service.

FIG. 3 illustrates a system for routing requests according to an example embodiment. As shown, a system 300 includes a router 310 and server pools 320_1-320_n. In FIG. 3, n equals 3, but it should be understood that n may be any number greater than or equal to 1.

While "router" is used to refer to 310, it should be understood that the router 310 may be a gateway or any other element that is configured to receive requests and include the algorithm of FIGS. 1A-1C and 2A-2C implemented in software or hardware.

The router 310 is configured to receive requests of request types i and k. For the sake of simplicity, two types of requests are used to describe example embodiments, however, it should be understood that example embodiments are not limited to two types of requests. The router includes a virtual system 315. The virtual system 315 is either implemented in hardware or software of the router 310. The virtual system 315 is configured to implement the algorithm as described with reference to the methods shown in FIGS. 1A-1C and 2A-2C.

The virtual system 315 is configured to implement the algorithm when a request is received and at certain time points. The router routes the request according to the current values of routing probabilities to at least one of the server pools 320_1-320_n. For example, if the system 315 is overloaded, the system 315 blocks or routes the request using a random number generator having values 0–J with probabilities $\Phi_{i0}$-$\Phi_{iJ}$, respectively. If a value of "0" is generated, then the request is blocked.

As shown, the server pools 320_1-320_n may include queues $M_{i1}$-$M_{in}$ and $M_{k1}$-$M_{kn}$ for the requests of request types i and k, respectively. Once the requests are routed and served, each request has a probability $p_{ik}^{(j)}$ that request type i served by pool j is rerouted as request type k (or vice versa), shown by the doted arrows returning to the router 310 and brings the system a corresponding reward $w_{ij}^{(j)}$. Additionally, each request has a probability $p_{i0}^{(j)}$ of exiting the system 300, and the corresponding reward $w_{i0}^{(j)}$.

As described above, example embodiments include "running" a virtual (shadow-system) queuing system based on actual arrivals of customers to the network. Example embodiments produce routing automatically, without explicitly solving the linear program and measuring input rates. Thus, example embodiments have a lower implementation complexity and higher robustness.

Example embodiments do not require knowledge or of input rates of different types of requests. Moreover, example embodiments disclose methods for server pool load balancing when a system is not overloaded, and other methods for managing system revenue when the system is overloaded. Methods for managing system revenue (reward) picks customers that should be blocked, i.e., denied service.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A method of routing requests within a system having a plurality of server pools, the method comprising:
   receiving a request at the system;
   first determining a first value associated with a first request type of the received request, the first value modeling a number of requests of the first request type in a virtual queue;
   second determining probabilities of routing based on the first value and probabilities of rerouting for further processing, the second determining being performed without determining an input rate of received requests of the first request type; and
   routing the received request to at least one of the plurality of server pools based on the probabilities of routing.

2. The method of claim 1, wherein the first determining includes,
   increasing the first value.

3. The method of claim 1, wherein the second determining includes,
   updating the first value periodically.

4. The method of claim 3, wherein
   the first determining determines the first value associated with the first request type, the first request type being one of a plurality of request types and each of the plurality of request types having an associated value, the first value being the associated value for requests of the first request type, and
   the updating updates the associated values for the plurality of request types.

5. The method of claim 3, wherein the updating is based on a mean service time for requests of the first request type, a probability of rerouting associated with the first request type and a second value, the second value modeling a number of requests of the second request type in a virtual queue.

6. The method of claim 5, wherein the updating updates the first value if $$-1 + \sum_j \max_i c\tau\beta_j \mu_{ij} \left[ \eta Q_i - \sum_{k=1}^{I} p_{ik}^{(j)} \eta Q_k \right]^+ \geq 0$$

wherein i is the first request type, k is the second request type, j is the at least one of the plurality of server pools, r and c are parameters greater than zero, $Q_i$ is the first value for the first request type i, $Q_k$ is the second value associated with the second request type k, $\beta_j$ is a number proportional to the number of servers in the at least one of the plurality of server pools j, $1/\mu_{ij}$ is the mean service time for the first request type i and the server pool j, $\eta$ is a parameter and $p_{ik}^{(j)}$ is a probability of rerouting that the first request type i request served by the pool j is rerouted as the second request type k request.

7. The method of claim 6, wherein the updating updates the first value if $$\max_i \mu_{ij} \left[ \eta Q_i - \sum_{k=1}^{I} p_{ik}^{(j)} \eta Q_k \right] > 0$$

for the server pool j.

8. The method of claim 7, wherein the updating updates the first value $Q_i$ and determines values $S_j$, $Q_{i*}$ and $A_{i*,j}$ as follows $$S_j = \min\{Q_{i*} c\tau\beta_j \mu_{i*,j}\}$$

$$Q_{i*} := Q_{i*} - (1 - p_{i*,i*})S_j$$

$$Q_i := Q_i + p_{i*,i}S_j, i \in \mathcal{I}, i \neq i*$$

$$A_{i*,j} := A_{i*,j} + S_j$$

wherein i* is $$i^* \in \mathrm{argmax}_i \mu_{ij} \left[ \eta Q_i - \sum_{k=1}^{I} p_{ik}^{(j)} \eta Q_k \right].$$

9. The method of claim 8, wherein the updating includes determining an average of the value $A_{ij}$ and the probability of routing as follows:

$$\overline{A}_{ij} := \eta_1 A_{ij} + (1-\eta_1)\overline{A}_{ij}$$

$$\phi_{ij} := \frac{\overline{A}_{ij}}{\sum_m \overline{A}_{im}}$$

wherein $\Phi_{ij}$ is the probability of routing the first request type i request to the server pool j.

10. The method of claim 5, wherein the updating updates the first value if $$\max_i \mu_{ij} \left[ \sum_{k=1}^{I} p_{ik}^{(j)} (w_{ik}^{(j)} - nV_i + nV_k) + p_{i0}^{(j)} (w_{i0}^{(j)} - nV_i) \right] > 0$$

wherein i is the first request type, k is the second request type, j is the at least one of the plurality of server pools, $V_i$ is the first value for the request type i, $V_k$ is the second value associated with the second request type k, $\mu_{ij}$ is a mean service time for the request type i and the server pool j, n is a parameter, $p_{ik}^{(j)}$ is a probability of rerouting that the first request type i request served by pool j is rerouted as the second request type k request, and $w_{ik}^{(j)}$ is a corresponding reward.

11. The method of claim 10, wherein the updating updates the first value $V_i$ and determines values $A_{i0}$, $V_{i*}$ and $A_{i*,j}$ as follows:

$$V_{i*} := V_{i*} + \tau\beta_j \mu_{i*,j}(1 - p_{i*,i*})$$

$$V_i := [V_i - \tau\beta_j \mu_{i*,j} p_{i*,i}]^+, i \in \mathcal{I}, i \neq i*$$

$$A_{i*,j} := A_{i*,j} + \tau\beta_j \mu_{i*,j}$$

$$A_{i0} := A_{i0} + [V_i - \tau\beta_j \mu_{i*,j} p_{i*,i}]^-, i \in \mathcal{I}, i \neq i*$$

wherein i* is $$i^* \in \operatorname*{argmax}_{i} \mu_{ij} \left[ \sum_{k=1}^{I} p_{ik}^{(j)} \left( w_{ik}^{(j)} - \eta V_i + \eta V_k \right) + p_{i0}^{(j)} \left( w_{i0}^{(j)} - \eta V_i \right) \right].$$

12. The method of claim 11, wherein the updating includes determining an average of the value $A_{ij}$ and the probability of routing as follows:

$$\overline{A}_{ij} := \eta_1 A_{ij} + (1 - \eta_1) \overline{A}_{ij}$$

$$\phi_{ij} := \frac{\overline{A}_{ij}}{\sum_m \overline{A}_{im}}$$

wherein $\Phi_{ij}$ is the probability of routing the first request type i request to the server pool j, and $\Phi_{i0}$ is a probability of blocking the first request type i request.

13. The method of claim 1, wherein the first determining is not based on measurements of input rates of different request types.

14. The method of claim 1, wherein the first determining includes,
  decreasing the first value associated with the first request type.

15. A method of controlling a routing system, the method comprising:
  receiving a request having a first request type, the first request type being associated with a first value, the first value modeling a number of requests of the first request type in a virtual queue;
  updating the first value periodically based on a mean service time to process the request and at least a second value associated with a second request type, the updating being performed without determining an input rate of received requests of the first request type and, the second value modeling a number of requests of the second request type in a virtual queue; and
  routing the request based on the updating.

16. The method of claim 15, wherein the updating updates the first value if $$-1 + \sum_j \max_i c \tau \beta_j \mu_{ij} \left[ \eta Q_i - \sum_{k=1}^{I} p_{ik}^{(j)} \eta Q_k \right]^+ \geq 0$$

wherein i is the first request type, k is the second request type, j is the at least one of the plurality of server pools, $\tau$ and c are parameters greater than zero, $Q_i$ is the first value, $\beta_j$ is a number servers in the at least one of the plurality of server pools j, $1/\mu_{ij}$ is the mean service time for the first request type i request and the server pool j, $\eta$ is a parameter and $p_{ik}^{(j)}$ is a probability that the first request type i request served by pool j is rerouted as the second request type k request.

17. The method of claim 15, wherein the updating updates the first value if $$\max_i \mu_{ij} \left[ \sum_{k=1}^{I} p_{ik}^{(j)} \left( w_{ik}^{(j)} - n V_i + n V_k \right) + p_{i0}^{(j)} \left( w_{i0}^{(j)} - n V_i \right) \right] > 0$$

wherein i is the first request type, k is the second request type, j is the at least one of the plurality of server pools, $V_i$ is the first value, $1/\mu_{ij}$ is the mean service time for the first request type i and the server pool j, n is a parameter, $p_{ik}^{(j)}$ is a probability of rerouting that the first request type i request served by pool j is rerouted as the second request type k request, and $w_{ik}^{(j)}$ is a corresponding reward for the second request type k request.

18. The method of claim 15, further comprising:
  increasing the first value associated with the first request type when the request is received.

19. The method of claim 15, further comprising:
  decreasing the first value associated with the first request type when the request is received.

20. The method of claim 15, wherein
  the updating includes,
    determining a probability of routing based on the mean service time to process the request, at least the second value and a probability of rerouting, and
  the routing routes the request based on the probability of routing.

* * * * *